US011731764B2

(12) United States Patent
Katakura et al.

(10) Patent No.: US 11,731,764 B2
(45) Date of Patent: Aug. 22, 2023

(54) AIRCRAFT SEAT STRUCTURE

(71) Applicant: JAMCO CORPORATION, Tokyo (JP)

(72) Inventors: Sachiko Katakura, Tokyo (JP); Hisaya Hagiwara, Tokyo (JP); Rei Kigoshi, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 127 days.

(21) Appl. No.: 17/440,782

(22) PCT Filed: Mar. 13, 2020

(86) PCT No.: PCT/JP2020/011075
§ 371 (c)(1),
(2) Date: Sep. 19, 2021

(87) PCT Pub. No.: WO2020/195945
PCT Pub. Date: Oct. 1, 2020

(65) Prior Publication Data
US 2022/0161929 A1    May 26, 2022

(30) Foreign Application Priority Data

Mar. 27, 2019 (JP) ................. 2019-059826

(51) Int. Cl.
B64D 11/00 (2006.01)
B64D 11/06 (2006.01)
(52) U.S. Cl.
CPC ...... B64D 11/00151 (2014.12); B64D 11/064 (2014.12); B64D 11/0606 (2014.12); B64D 11/0643 (2014.12)
(58) Field of Classification Search
CPC .......... B64D 11/00151; B64D 11/0606; B64D 11/064; B64D 11/0643
See application file for complete search history.

(56) References Cited

U.S. PATENT DOCUMENTS 10,647,221 B2 *   5/2020  Trillaud ............. B64D 11/0604
2015/0225086 A1 * 8/2015  Darbyshire ........ B64D 11/0606
                                                            244/118.6
(Continued)

FOREIGN PATENT DOCUMENTS

EP   0957025 A2   11/1999
EP   2147614 A1    1/2010
(Continued)

OTHER PUBLICATIONS

International Search Report for corresponding Application No. PCT/JP2020/011075, dated Jun. 9, 2020.
(Continued)

Primary Examiner — Anthony D Barfield
(74) Attorney, Agent, or Firm — Renner, Otto, Boisselle & Sklar, LLP

(57) ABSTRACT

Provided is an aircraft seat structure capable of ensuring passenger comfort and effectively utilizing space in the cabin. The aircraft seat structure includes a first seat unit having a first seat region in which passengers are able to sit, and a first side region adjacent in a direction perpendicular to a longitudinal direction of the first seat region; and a second seat unit having a second seat region in which passengers are able to sit, and a second side region adjacent in a direction perpendicular to a longitudinal direction of the second seat region. The first side region is provided on one side of the first seat region along a direction that intersects a traveling direction of an aircraft, and the second side region is provided on another side of the second seat region along the direction that intersects the traveling direction of the aircraft. The first side region and the second seat region are joined in a state in which a portion of the second seat region is inserted into the first side region. The first side region and the second side region are separated by a partition (Continued)

wall, and the partition wall has an inclined surface tilted toward the second seat unit.

8 Claims, 8 Drawing Sheets

(56) References Cited

U.S. PATENT DOCUMENTS

| | | |
|---|---|---|
| 2016/0083094 A1 | 3/2016 | Clucas |
| 2019/0337624 A1 | 11/2019 | Kasuya |
| 2022/0033083 A1 | 2/2022 | Chareyre et al. |

FOREIGN PATENT DOCUMENTS

| | | |
|---|---|---|
| EP | 3446977 A1 | 2/2019 |
| WO | 2012/131384 A2 | 10/2012 |
| WO | 2017/168746 A1 | 10/2017 |
| WO | 2020/089442 A1 | 5/2020 |

OTHER PUBLICATIONS

Written Opinion for corresponding Application No. PCT/JP2020/011075, dated Jun. 9, 2020.

\* cited by examiner

AIRCRAFT SEAT STRUCTURE

TECHNICAL FIELD

The present invention relates to an aircraft seat structure.

BACKGROUND OF THE INVENTION

In aircraft, seat structures capable of selectively changing between an upright state in which a backrest is upright and a reclining state in which the backrest is tilted to approach a horizontal state are mounted as seats for first class, business class or the like.

Many such seat structures are configured as seat modules (seat units) in which reclining seats are arranged in a space partitioned by wall-shaped members or the like.

Here, if an interval is set between the front side seat and the rear side seat, the space that can be used is increased and passenger comfort is improved. However, since the space inside the aircraft is limited, this leads to a decreases in the number of seat modules that can be mounted; that is a decrease in the passenger capacity. Accordingly, Patent Document 1, for example, discloses a seat configuration in which the front side seat and the rear side seat are alternately arranged on the left and right with respect to the traveling direction of the aircraft.

According to the seat configuration of the prior art, a space (a footwell) that can be used by a passenger seated on the rear seat is separately formed below the region beside the front side seat. Accordingly, when the rear side seat is used as a bed in a horizontal state, the legs of the passenger can be accommodated in this space. Therefore, a passenger can lie in a comfortable posture with their legs extended without increasing the interval between the front side seat and the rear side seat. Meanwhile, since the space is separated from the front side seat, the passenger using the front side seat will not mind the presence of the feat of the passenger on the rear side seat.

CITATION LIST

Patent Documents

[Patent Document 1] International Patent Publication No. WO 2017/168746

SUMMARY OF INVENTION

Technical Problem

Incidentally, in order to provide passengers with a comfortable flight, monitors (displays) for watching movies and the like during the flight are being installed. In the seat disclosed in Patent Document 1, a monitor can be installed on an erect front wall in front of the rear side seat. Such a front wall is located beside the passenger utilizing the front side seat.

However, if such an erect front wall is positioned beside the passenger utilizing the front side seat, the space around the shoulders of this passenger is limited, which may feel oppressive to the passenger. In addition, since the space in which the passenger seated on the rear side seat accommodates their feet is in the shape of a box having an opening in the horizontal direction, there is a problem that it is difficult for passengers to move their feet in and out of the box.

Accordingly, the present invention is to provide an aircraft seat structure that can ensure passenger comfort and effectively utilize the space in the cabin.

Means for Solving the Problems

In order to achieve the above object, the aircraft structure according to the present invention includes a first seat unit having a first seat region in which passengers are able to sit, and a first side region adjacent in a direction perpendicular to a longitudinal direction of the first seat region; and a second seat unit having a second seat region in which passengers are able to sit, and a second side region adjacent in a direction perpendicular to a longitudinal direction of the second seat region; wherein: the first side region is provided on one side of the first seat region along a direction that intersects a traveling direction of an aircraft, and the second side region is provided on another side of the second seat region along the direction that intersects the traveling direction of the aircraft, the first side region and the second seat region are joined in a state in which a portion of the second seat region is inserted into the first side region, the first side region and the second side region are separated by a partition wall, and the partition wall has an inclined surface tilted toward the second seat unit.

Advantageous Effects of Invention

According to the present invention, the comfort of passengers can be ensured, and the space in the cabin can be effectively utilized.

DESCRIPTION OF EMBODIMENT(S)

Figure 1:
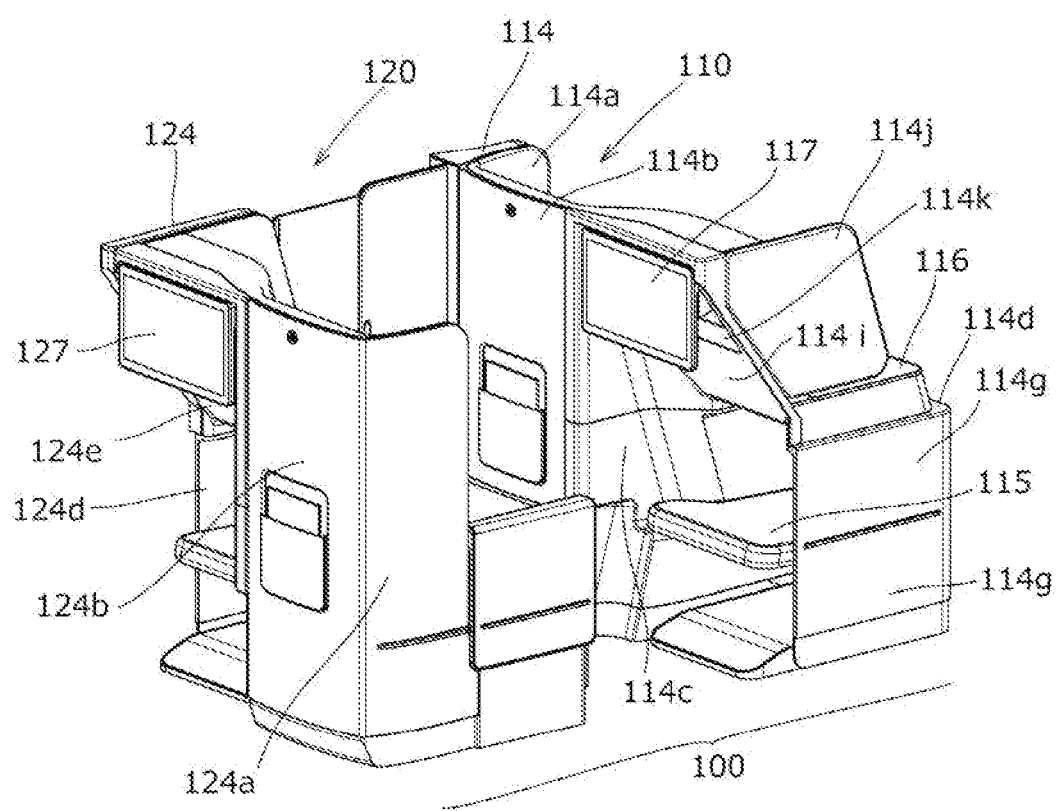
FIG. 1 is a perspective view from the rear side of the aircraft seat structure according to the first embodiment.
Figure 2:
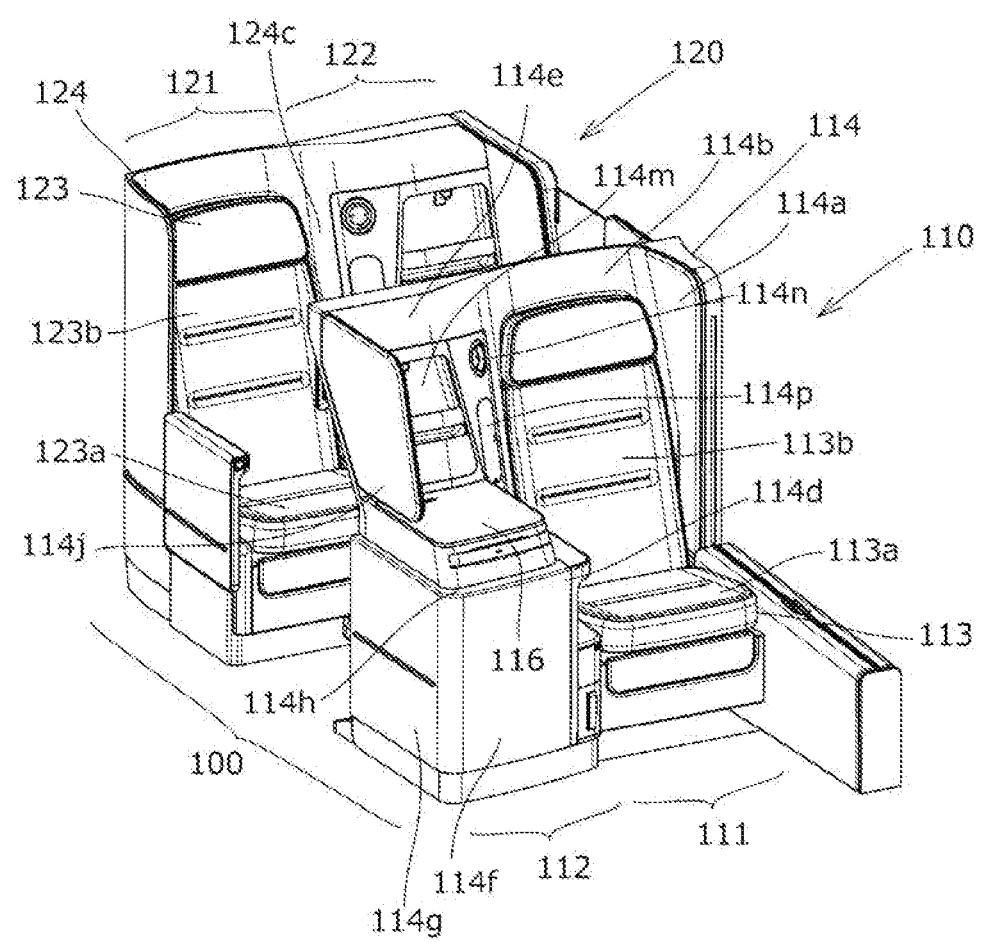
FIG. 2 is a perspective view from the front side of the aircraft seat structure according to the present embodiment.
Figure 3:
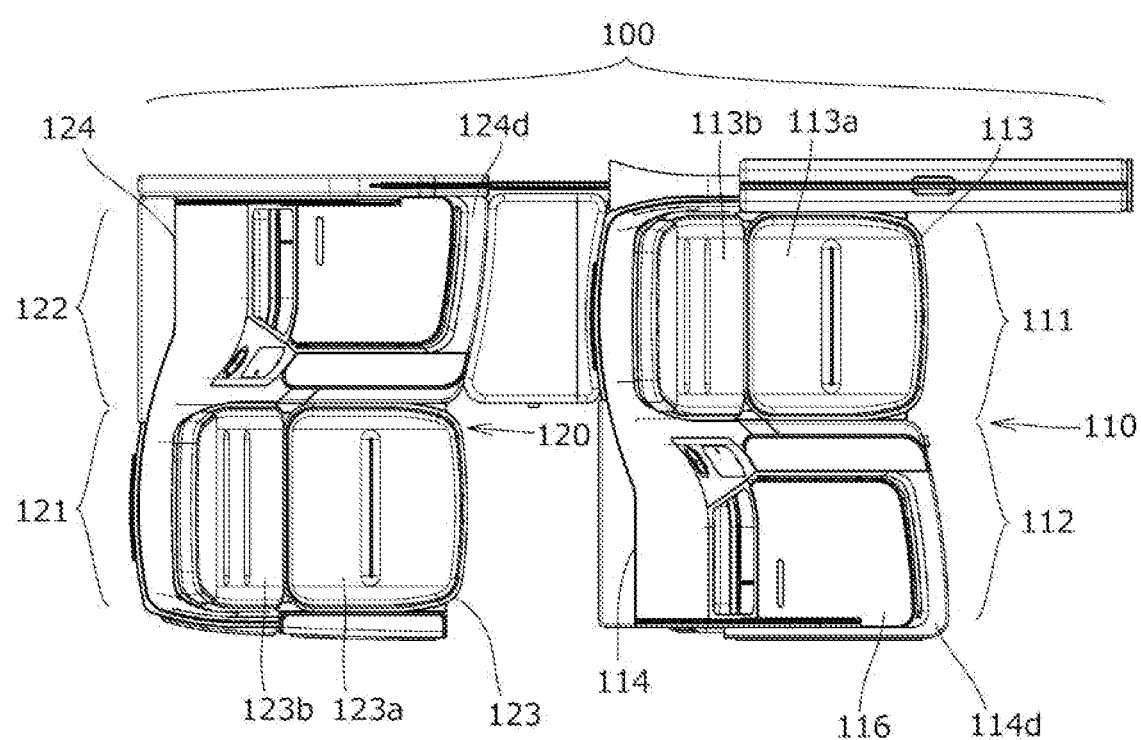
FIG. 3 is a top view of the aircraft seat structure according to the present embodiment.
Figure 4:
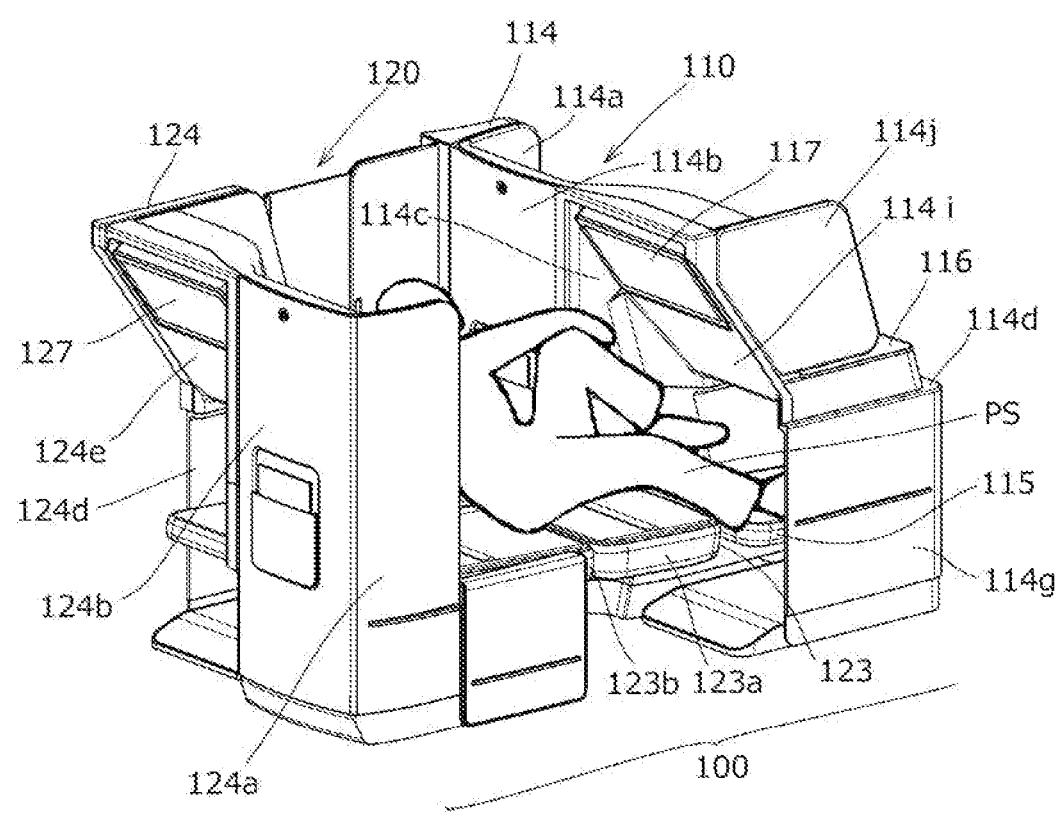
FIG. 4 is a perspective view from the rear side of the aircraft seat structure according to the present embodiment.

FIG. 1 is a perspective view from the rear side of the aircraft seat structure according to a first embodiment of the present invention, and illustrates an upright state. FIG. 2 is a perspective view from the front side of the aircraft seat structure according to the present embodiment. FIG. 3 is a top view of the aircraft seat structure according to the present embodiment. FIG. 4 is a perspective view from the rear side of the aircraft seat structure according to the present embodiment, and illustrates a reclining state.

Here, the aircraft seat structure 100 will be described as a single unit having a first seat unit 110 and a second seat unit 120 coupled to the rear side of the first seat unit 110.

The first seat unit 110 includes a first seat region 111 including a seat 113, and a first side region 112 provided laterally adjacent to the seat 113. The seat 113 can be changed in form between an upright state in which the backrest is upright and a reclining state in which the backrest is tilted to approach a horizontal state.

Similarly, the second seat unit 120 includes a second seat region 121 including a seat 123, and a first side region 122 provided laterally adjacent to the seat 122. The seat 123 can be changed in form between an upright state in which the backrest is upright and a reclining state in which the backrest is tilted to approach a horizontal state.

Further, as illustrated in FIG. 2 and FIG. 3, the first side region 112 of the first seat unit 110 is provided on the right side of the seat 113 along a direction that intersects the traveling direction of the aircraft, and the second side region 122 of the second seat unit 120 is provided on the left side of the seat 123 along a direction that intersects the traveling direction of the aircraft.

At this time, it is preferable that the first seat unit 110 and the second seat unit 120 be formed such that their respective seat areas and side areas have the same size. In this way, the seats 113 and 123 can have a common shape, and the parts can be standardized.

The seat 113 includes a seating portion 113a and a backrest 113b that is tiltable with respect to the seating portion 113a. Similarly, the seat 123 includes a seating portion 123a and a backrest 123b that is tiltable with respect to the seating portion 123a.

A partition wall 114 integrally formed of a composite material is disposed between the first seat unit 110 and the second seat unit 120. The partition wall 114 includes, in a continuously joined fashion, a seat side surface portion 114a that surrounds the side portion of the seat 113, a seat back surface portion 114b that covers the back surface of the seat 113, an intermediate wall 114c formed between the seat 113 and the first side region 112, a housing portion 114d forming the first side region 112, and a monitor mounting wall 114e (FIG. 2) extending from the housing portion 114d to the second seat unit 120 side.

The interior of the housing portion 114d is separated from the first seat unit 110 by the intermediate wall 114c, a front panel 114f, a side panel 114g, and a top panel 114h. However, the second seat unit 120 side of the housing portion 114d is open, and the internal space of the housing portion 114d can be accessed from here. In other words, the housing portion 114d serves as a partition, and the first side region 112 is joined in a state in which a part of the second seat region 121 is inserted. A sound absorbing material or the like may be attached to the inner wall of the housing portion 114d.

Inside the housing portion 114d, a foot rest portion 115 supported at both ends by the intermediate wall 114c and the side panel 114g is disposed. The lower portion of the foot rest portion 115 can be used as a space for placing small baggage or the like.

A side table 116 that can be used by a passenger seated on the seat 113 is disposed on the top panel 114h of the housing portion 114d (FIG. 2).

The monitor mounting wall 114e extends at an incline from the upper end edge of the housing portion 114d on the second seat unit 120 side toward the second seat unit 120 side. Since the monitor mounting wall 114e is inclined toward the second seat unit 120, passengers using the first seat unit 110 do not feel feelings of oppressiveness.

The back surface (the lower surface) of the monitor mounting wall 114e is an inclined surface 114i tilted so as to fall toward the second seat unit 120 side. The inclined surface 114i is connected to the lower surface of the top panel 114h of the housing portion 114d. A partition plate 114j is supported on the side edge of the monitor mounting wall 114e and extends in the same direction as the side panel 114g of the housing portion 114d. The inclination angle of the inclined surface 114i is preferably within 45 degrees with respect to the horizontal plane.

In the vicinity of the upper end of the inclined surface 114i, an upper edge of a monitor 117 with its screen facing the second seat unit 120 side is attached via a hinge (not shown in the figure). By attaching the monitor 117 in the vicinity of the upper end of the inclined surface 114i, the distance between the passenger using the second seat unit 120 and the monitor screen can be reduced, such that high-definition images or videos can be viewed even on a small screen. Further, the monitor 117 can be manually or electrically displaced between the erect position illustrated in FIG. 1 and the tilted position illustrated in FIG. 4. In the tilted position, the monitor 117 extends in a direction along the inclined surface 114i.

The inclined surface 114i may be provided with a rectangular concave portion 114k into which the electronic component accommodating portion on the back surface of the monitor 117 fits when the monitor 117 is tilted (FIG. 1). In this way, the difference in height between the screen of the monitor 117 and the inclined surface 114i can be reduced.

When the monitor 117 is tilted to the erect position as illustrated in FIG. 1, a triangular, tubular space is formed between the monitor 117 and the inclined surface 114i. For this reason, in the case that a passenger's head falls forward and hits the monitor 117 as a result of the aircraft shaking, for example, the monitor 117 can retract with a light force, thereby enhancing safety. It should be noted that, although not illustrated in the figures, when the monitor 117 in the erect position is pushed by a force equal to or greater than a threshold value from the second seat unit 120 side, the monitor 117 may be unlocked and the monitor 117 may automatically retract to the position illustrated in FIG. 4 by the force of a spring.

In FIG. 2, a pocket 114m for accommodating headphones or the like, a light 114n for the first seat unit 110, and an accommodation portion 114p for accommodating a remote controller for in-flight entertainment or the like is formed on the front surface of the monitor mounting wall 114e.

On the other hand, a partition wall 124 integrally formed of composite materials is disposed between the second seat unit 120 and the rear side seat unit thereof (not illustrated in the Figure). The partition wall 124, which has a shape that is a mirror image of the partition wall 114, includes a seat side surface portion 124a that surrounds the side portion of the seat 123, a seat back surface portion 124b that surrounds the back surface of the seat 123, an intermediate wall 124c (FIG. 2) formed between the seat 123 and the second side region 122, a housing portion 124d forming the second side region 122, and a monitor mounting wall 124e extending rearward from the housing portion 124d. It should be noted that a redundant description of configurations similar to that of the first seat unit 110 will be omitted.

The housing portion 124d has a similar configuration to the housing portion 114d, and the monitor mounting wall 124e has a similar configuration to the monitor mounting wall 114e. A monitor 127 is tiltably mounted on the monitor mounting wall 124e.

Figure 5:
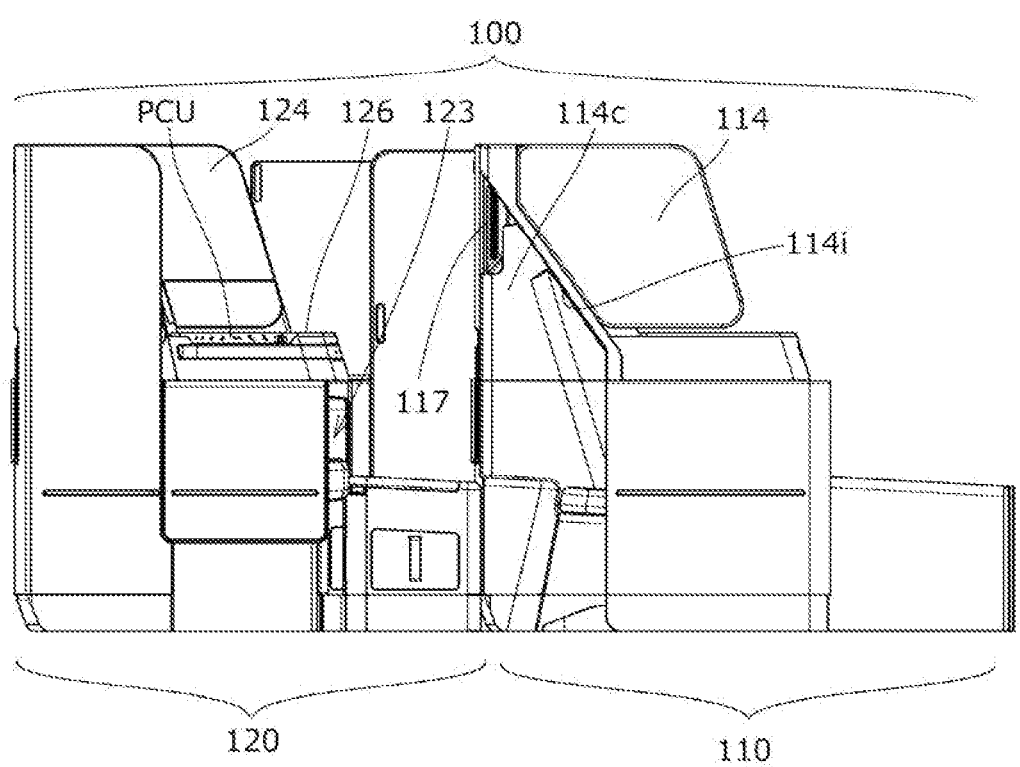
FIG. 5 is a side view of the aircraft seat structure according to the present embodiment as viewed from the right side in the traveling direction.

A passenger control unit PCU equipped with an on/off switch for the monitor 117 viewed by the passenger sitting on the seat 123, a switch for selecting a channel, a knob for changing a sound volume, a switch for performing tilting in the case that the monitor is configured to be tilted by electric power, a switch for changing the seat 123 to an upright state or a reclining state, and the like is disposed below the side table 126 so as to face the seat 123 (FIG. 5). It should be noted that a similar passenger control unit is also arranged for the first seat unit 110.

The seat 123 of the second seat unit 120 can be form changed between an upright state and a reclining state by a driving mechanism (not illustrated in the figure) by operating the passenger control unit PCU. Such a driving mechanism can use, for example, the technique of Japanese Translation of PCT International Application Publication No. 2010-520117.

More specifically, in the case that the seat 123 is in the upright state, the backrest 123b is angled at approximately 100 degrees with respect to the seating portion 123a. The passenger seated on the seat 123 in this state can see the screen of the monitor 117 while being supported by the backrest 123b. In addition, the passenger may also place their feet on the foot rest portion 115.

At this time, by displacing the monitor 117 with the hand of the passenger or by operating the passenger control unit PCU and setting the monitor 117 to an erect position as illustrated in FIG. 1, since the face of the passenger faces the monitor 117, the images displayed on the monitor 117 can be naturally viewed.

On the other hand, in the case of changing the seat 123 to the reclining state, driven by the driving mechanism not illustrated in the figure, the seating portion 123a advances toward the housing portion 114d while the backrest 123b approaches the horizontal and enters a state of being close to or in contact with the foot rest portion 115 as illustrated in FIG. 4. In the reclining state, the backrest 123b, the seating portion 123a, and the foot rest portion 115 are in a substantially flat state.

At this time, the passenger PS can lie on the seat 123 that has been set to the reclining state, and the monitor 117 can be displaced to a position parallel to the inclined surface 114i as illustrated in FIG. 4 by the hand of the passenger or by operation of the passenger control unit PCU. In this way, even when the passenger PS is lying down, since the face of the passenger PS faces the monitor 117, the images displayed on the monitor 117 can be naturally viewed.

In addition, since a large space is formed below the monitor 117 and the inclined surface 114i in the tilted position, the passenger PS can take a relaxed posture such as crossing their legs or curling their body and tilting their head forward without being obstructed by the monitor 117, thereby achieving a comfortable flight.

Figure 6:
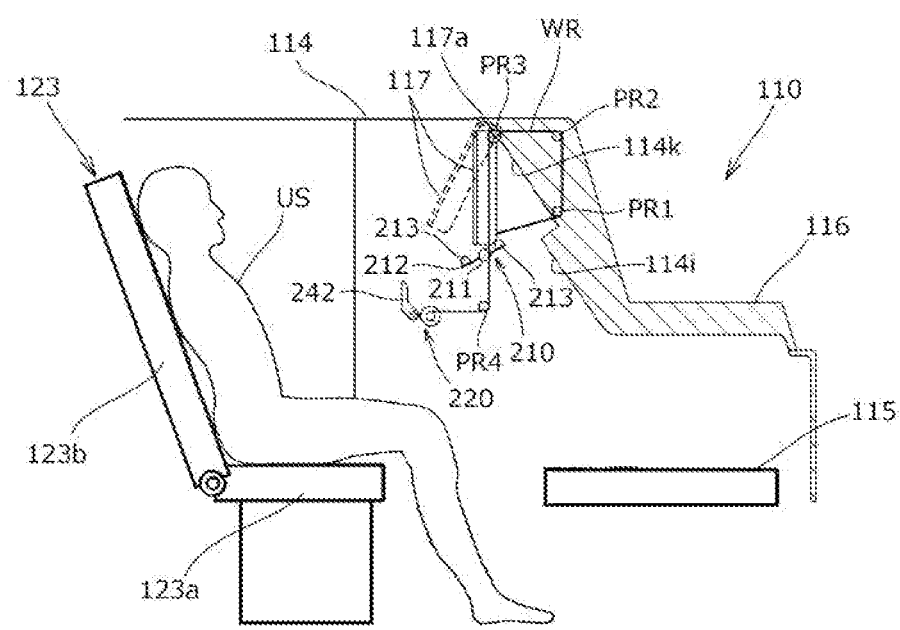
FIG. 6 is a side view illustrating the aircraft seat structure according to the second embodiment as seen from the side.
Figure 7:
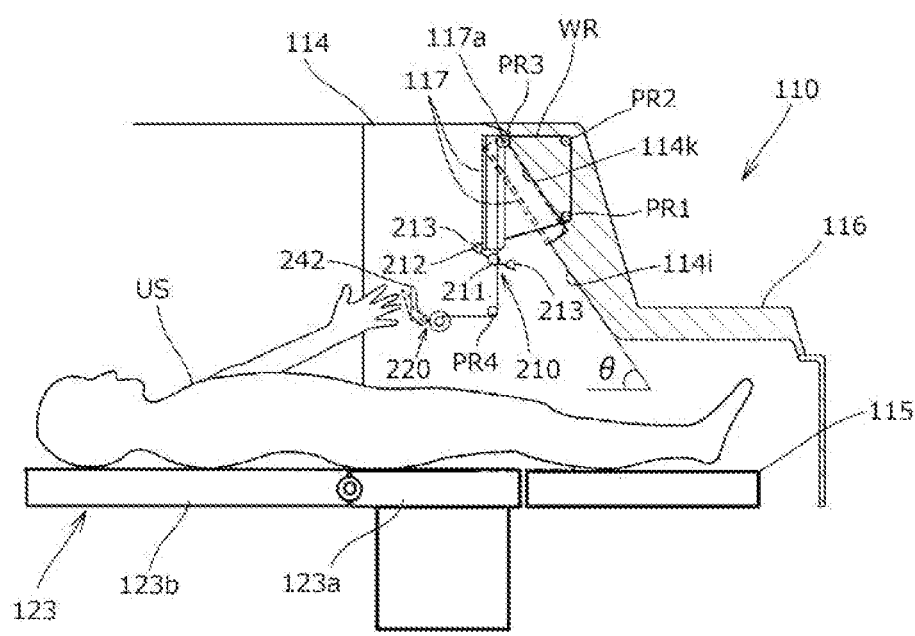
FIG. 7 is a side view illustrating the aircraft seat structure according to the second embodiment as seen from the side.

FIG. 6 and FIG. 7 are side views illustrating the aircraft seat structure according to the second embodiment as seen from the side. FIG. 6 illustrates the seat 123 of the second seat region in the upright state. FIG. 7 illustrates the seat 123 of the second seat region in the reclining state. It should be noted that the same reference numerals are assigned to the same configurations as those of the above-described embodiments, and a repetitive description thereof is omitted.

In the present embodiment, the monitor 117 is rotatably attached to the upper end of the inclined surface 114i of the first seat unit 110 via a rotation shaft 117a. It is assumed that the monitor 117 is constantly urged clockwise about the rotation shaft 117a in FIG. 6 and FIG. 7 by a spring (not illustrated in the figure) having a weaker urging force than a spiral spring 234 (to be described later). Near the lower end of the monitor 117, a locking device 210 is attached to the partition wall 114.

The locking device 210 includes a swing shaft 211 that extends in a direction perpendicular to the paper surface and can swing with respect to the partition wall 114, a swing plate 212 that extends in the radial direction from the swing shaft 211, and a locking portion 213 protruding upward from both ends of the swing plate 212.

The end of the wire WR is connected to the lower end of the back surface of the monitor 117. The wire WR is connected to a winding mechanism 220 via pulleys PR1, PR2, PR3, and PR4 that are rotatably attached to the partition wall 114. As described above, since the monitor 117 is biased clockwise by a spring (not illustrated in the figure), if the tension of the wire WR is not applied, the monitor 117 will tilt to the tilted end illustrated by the dotted line in FIG. 6 or the erect position illustrated by the solid line in FIG. 7.

Figure 8:
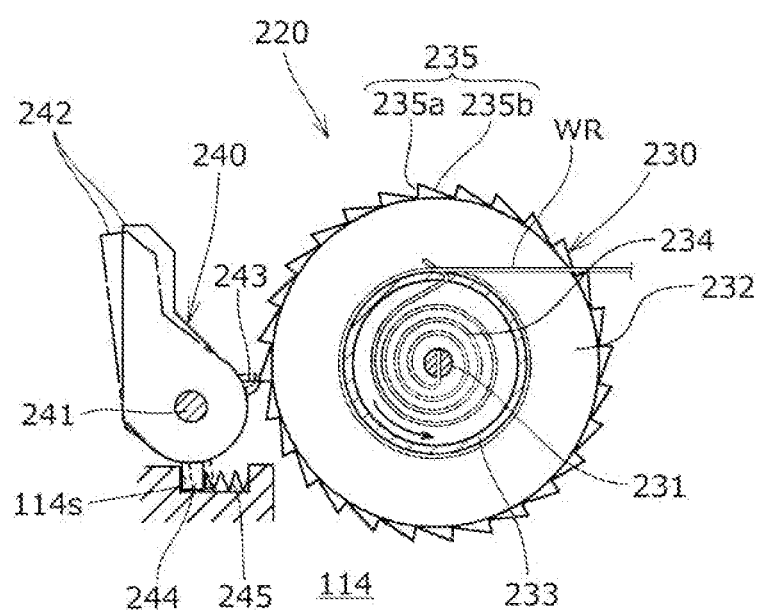
FIG. 8 is a schematic view of a winding mechanism used in the present embodiment.

FIG. 8 is a schematic view of the winding mechanism 220. In FIG. 8, the winding mechanism 220 that constitutes the driving mechanism includes a rotating portion 230 and a lever portion 240. The rotating portion 230 includes a fixed shaft 231 which is fixed to the partition wall 114, a toothed disk 232 which rotates about the fixed shaft 231, a drum 233 which is coaxially connected to the toothed disk 232, and a spiral spring 234 that connects the fixed shaft 231 and the drum 233.

On the outer periphery of the toothed disk 232, a plurality of teeth 235 having a short inclined surface 235a and a long inclined surface 235b are formed adjacent to each other in the circumferential direction. The short inclined surface 235a extends substantially along the radial direction of the toothed disk 232. The end of the wire WR is connected to the outer circumference of the drum 233, and the wire WR is wound around the outer circumference of the drum 233.

The lever portion 240 includes a lever shaft 241 fixed to the partition wall 114, and a lever (an operation unit) 242 that can swing around the lever shaft 241. The lever 242 is formed with a claw portion 243 protruding toward the toothed disk 232 and a convex portion 244 protruding downward. The claw portion 243 can be engaged with the short inclined surface 235a of the teeth 235 of the toothed disk 232. A spring 245 is arranged between the convex portion 244 and a portion of the partition wall 114, and the convex portion 244 is pressed toward a contact locking portion 114s by the urging force of the spring 245. The toothed disk 232 and the drum 233 are urged counterclockwise in FIG. 8 by the spiral spring 234, and in a free state, the claw portion 243 of the lever 242 comes into contact with the short inclined surface 235a of the teeth 235 of the toothed disk 232, such that the toothed disk 232 is prevented from rotating.

Next, the operation of the present embodiment will be described. Here, with regard to the angle of the monitor 117, when the axis of the monitor 117 is in the vertical direction (here, the direction perpendicular to the floor of the aircraft) as illustrated by the solid lines in FIG. 6 and FIG. 7, the monitor inclination angle is considered to be zero (the erect position), in the case that the monitor 117 is tilted toward a user US who views the screen of the monitor 117, the monitor inclination angle is considered to be in a negative angle range, and in the case that the monitor 117 is tilted away from the user US, the monitor inclination angle is considered to be in a positive angle range.

First, as illustrated in FIG. 6, in the case that the seat 123 is in the upright state, the swing shaft 211 of the locking device 210 swings counterclockwise so that the locking portion 213 comes into contact with the back surface of the monitor 117, which is in the erect position. This is referred to as the upright position. When the seat 123 is moved to the upright state, the locking device 210 may be swung to the upright position by an actuator or the like connected to the seat 123, or alternatively swung to the upright position in response to the movement of the seat 123 by the link mechanism.

In such a state, when the user US grasps the monitor 117 with their own hand and pulls it forward, the monitor 117 is tilted around the rotation shaft 117a, whereby the monitor 117 can be displaced to the most visible position. At this time, by setting the monitor inclination angle at which the monitor 117 can be tilted within the negative angle range (for example, 0 to −30 degrees), optimum viewing can be achieved in accordance with the body type of the user US. It should be noted that the monitor 117 abuts a stopper (not illustrated in the figure) at the maximum position in the negative angle range to prevent further tilting.

When the monitor 117 is swung forward, the wire WR is pulled and the drum 233 of the winding mechanism 220 illustrated in FIG. 8 rotates clockwise. At this time, the toothed disk 232 rotates clockwise together with the drum 233 against the urging force of the spiral spring 234, and the claw portion 243 of the lever 242 slides along the long inclined surface 235b of the teeth 235. When sliding, the claw portion 243 is pushed by the long inclined surface 235b, and each time the claw portion 243 passes by one long inclined surface 235b, the lever 242 tilts as illustrated by the dashed line in FIG. 8 while the convex portion 244 compresses the spring 245, allowing the drum 233 to rotate. As a result, the wire WR can be freely pulled out, such that the operation of the user who pulls out the monitor 117 forward is not hindered. Further, when the user US releases their hand, the toothed disk 232 rotates counterclockwise due to the urging force of the spiral spring 234, but the claw portion 243 engages with any of the short inclined surfaces 235a, whereby the rotation of the drum 233 is locked so that the monitor 117 stays in that position.

On the other hand, in the case that it is desired to return the monitor 117 to the original position, the user US tilts the lever 242 from the solid line position to the dashed line position against the urging force of the spring 245. As the lever 242 tilts, the claw portion 243 of the lever 242 disengages from the short inclined surface 235a of the teeth 235 of the toothed disk 232, and the urging force of the spiral spring 234 causes the toothed disk 232 and the drum 233 to begin to rotate counterclockwise in FIG. 8. As a result, the wire WR is pulled, drawing the lower end of the monitor 117 toward the inclined surface 114i, and the inclination angle of the monitor 117 approaches zero. When the user US releases their hand from the lever 242, the urging force of the spring 245 causes the lever 242 to return to its original position, and the claw portion 243 engages with the short inclined surface 235a, thereby stopping the rotation of the toothed disk 232 and the drum 233, and the monitor 117 remains in that position. When the user US continues to pull the lever 242, the locking portion 213 of the locking device 210 eventually hits the back of the monitor 117 to prevent further tilting, and the monitor 117 is engaged in a state where the inclination angle is zero.

It should be noted that the lever 242 can be tilted by remote control using, for example, an electromagnetic solenoid. For example, at the time of takeoff and landing of the aircraft, in principle, the seat 123 is returned to the upright state in order to ensure safety. At this time, the cabin attendant can operate switches (not illustrated in the figure) to tilt the levers 242 of each seat all at once.

Next, as illustrated in FIG. 7, when the seat 123 is in the reclining state, the swing shaft 211 of the locking device 210 swings clockwise so that the locking portion 213 comes into contact with the front surface of the monitor 117 in an erect position. This is referred to as the reclining portion.

When the user US lying on the seat 123 in the reclining state attempts to view the screen of the monitor 117 that is in the erect position, the user US looks up at the screen, which can often be difficult to see. However, if it is necessary for the user US to take the trouble to get up in order to tilt the monitor 117, this causes a burden on the user US. In the present embodiment, the lever 242 is positioned with the reach of the user US lying on the seat 123.

When the user US tilts the lever 242, as described above, the toothed disk 232 is rotated counterclockwise in FIG. 8 by the urging force of the spiral spring 234, the wire WR is pulled, and the monitor 117 can be tilted in a direction in which the inclination angle is in the positive angle range. When the user US releases their hand from the lever 242, the pulling of the wire WR is interrupted, and the monitor 117 remains in that position as described above. As a result, the user US can view the screen of the monitor 117 at a desired monitor inclination angle in the positive angle range. If the user US continues to pull the lever 242, the monitor 117 eventually tilts to a position in which it is accommodated in the concave portion 114k of the inclined surface 114i.

When the monitor 117 is accommodated in the concave portion 114k, further tilting is prevented, and the monitor 117 is locked at a monitor inclination angle which is the maximum value of the positive angle range (here, +35 degrees). The monitor inclination angle that is the maximum value of the positive angle range is preferably 30 degrees to 45 degrees in order to ensure the visibility of the monitor 117. In addition, it is preferable that the inclination angle θ of the inclined surface 114i with respect to the floor surface is equal to the maximum value of the monitor inclination angle in order to ensure effective utilization of the space and improvement of design.

Since the user US gets up by themself when returning the seat 123 to the upright state, the monitor 117 can be reached, and the monitor 117 can be grasped and returned to the erect position.

Although the aircraft seat structure according to the present embodiments has been described above, the present invention is not limited to the specific examples described above, and various modifications can be made. For example, the monitor 117 may be tiltable between two positions of an erect position and a tilted position, may be locked at a plurality of tilted positions between the erect position and the tilted position, or alternatively may be configured to be steplessly displaced and locked at an arbitrary position.

REFERENCE SIGNS LIST

10 Aircraft, 100 Aircraft Seat Structure, 110 First Seat Unit, 120 Second Seat Unit, 111, 121 Seat Region, 112, 122 Side Region, 113, 123 Seat, 114, 124 Partition Wall, Monitor 117,127, 210 Locking Device, 220 Winding Mechanism

The invention claimed is:

1. An aircraft seat structure comprising:
a first seat unit having a first seat region in which passengers are able to sit, and a first side region adjacent in a direction perpendicular to a longitudinal direction of the first seat region; and
a second seat unit having a second seat region in which passengers are able to sit, and a second side region adjacent in a direction perpendicular to a longitudinal direction of the second seat region;
wherein:
the first side region is provided on one side of the first seat region along a direction that intersects a traveling direction of an aircraft, and the second side region is provided on another side of the second seat region along the direction that intersects the traveling direction of the aircraft,
the first side region and the second seat region are joined in a state in which a portion of the second seat region is inserted into the first side region,
the first side region and the second side region are separated by a partition wall, and the partition wall has an inclined surface tilted toward the second seat unit,
a monitor is tiltably mounted to the inclined surface,
a seat of the second seat region can be changed in form between an upright state and a reclining state,
the monitor can be displaced between a tilted position corresponding to the upright state and a tilted position corresponding to the reclining state,
when the seat of the second seat region is in the upright state, the seat of the second seat region can abut a back surface of the monitor, and
the seat of the second seat region has a locking portion that can abut a front surface of the monitor when the seat of the second seat region is in the reclining state.

2. The aircraft seat structure according to claim 1, wherein:
the partition wall has a housing portion that separates the first side region and the second seat region; and
the inclined surface is a back surface of a mounting wall that extends from the housing portion toward the second seat unit.

3. The aircraft seat structure according to claim 2, wherein:
a foot rest portion is formed in the housing portion.

4. The aircraft seat structure according to claim 1, wherein:
when the monitor is displaced to the tilted position corresponding to the upright state, a space is formed between the monitor and the inclined surface; and
when the monitor is displaced to the tilted position corresponding to the reclining state, the monitor extends in a direction along the inclined surface.

5. The aircraft seat structure according to claim 1, wherein:
when the seat of the second seat region is in the upright state, the monitor can be titled in a negative angle range; and
when the seat of the second seat region is in the reclining state, the monitor can be titled in a positive angle range.

6. The aircraft seat structure according to claim 1, further comprising:
a driving mechanism for tilting the monitor to a predetermined position.

7. The aircraft seat structure according to claim 6, wherein:
an operation unit of the driving mechanism is arranged at a position accessible to a hand of a user lying on a seat in a reclining state.

8. The aircraft seat structure according to claim 1, wherein:
the inclined surface includes a concave portion for housing a portion of the monitor.

* * * * *